Dec. 5, 1944.   R. H. UPSON   2,364,494
METHOD OF APPLYING COVERING TO AIRPLANE WING FRAMES
Filed June 5, 1941   2 Sheets-Sheet 1
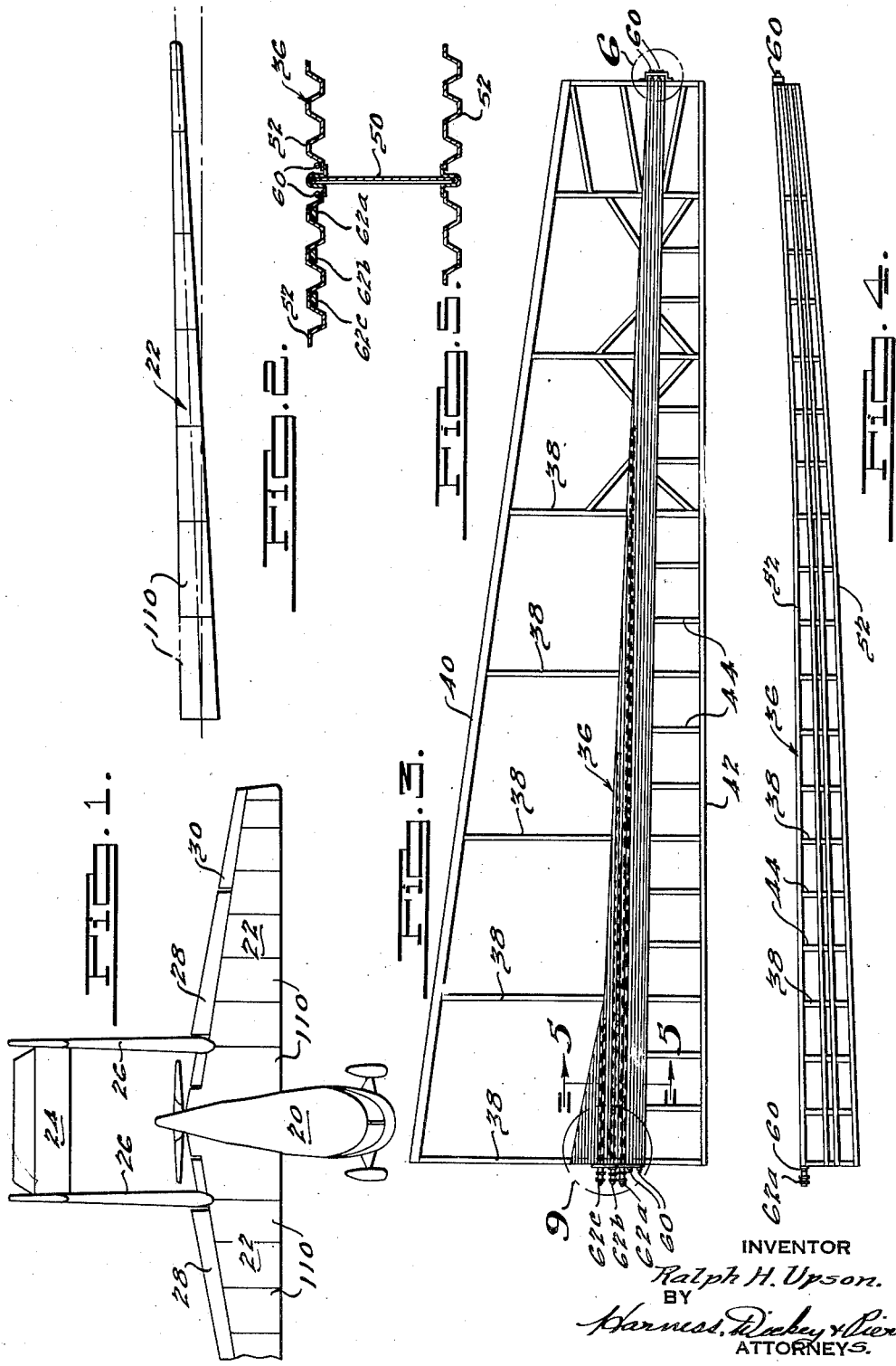
INVENTOR
*Ralph H. Upson.*
BY
*Harness, Dickey & Pierce*
ATTORNEYS.

Dec. 5, 1944.　　　R. H. UPSON　　　2,364,494
METHOD OF APPLYING COVERING TO AIRPLANE WING FRAMES
Filed June 5, 1941　　　2 Sheets-Sheet 2
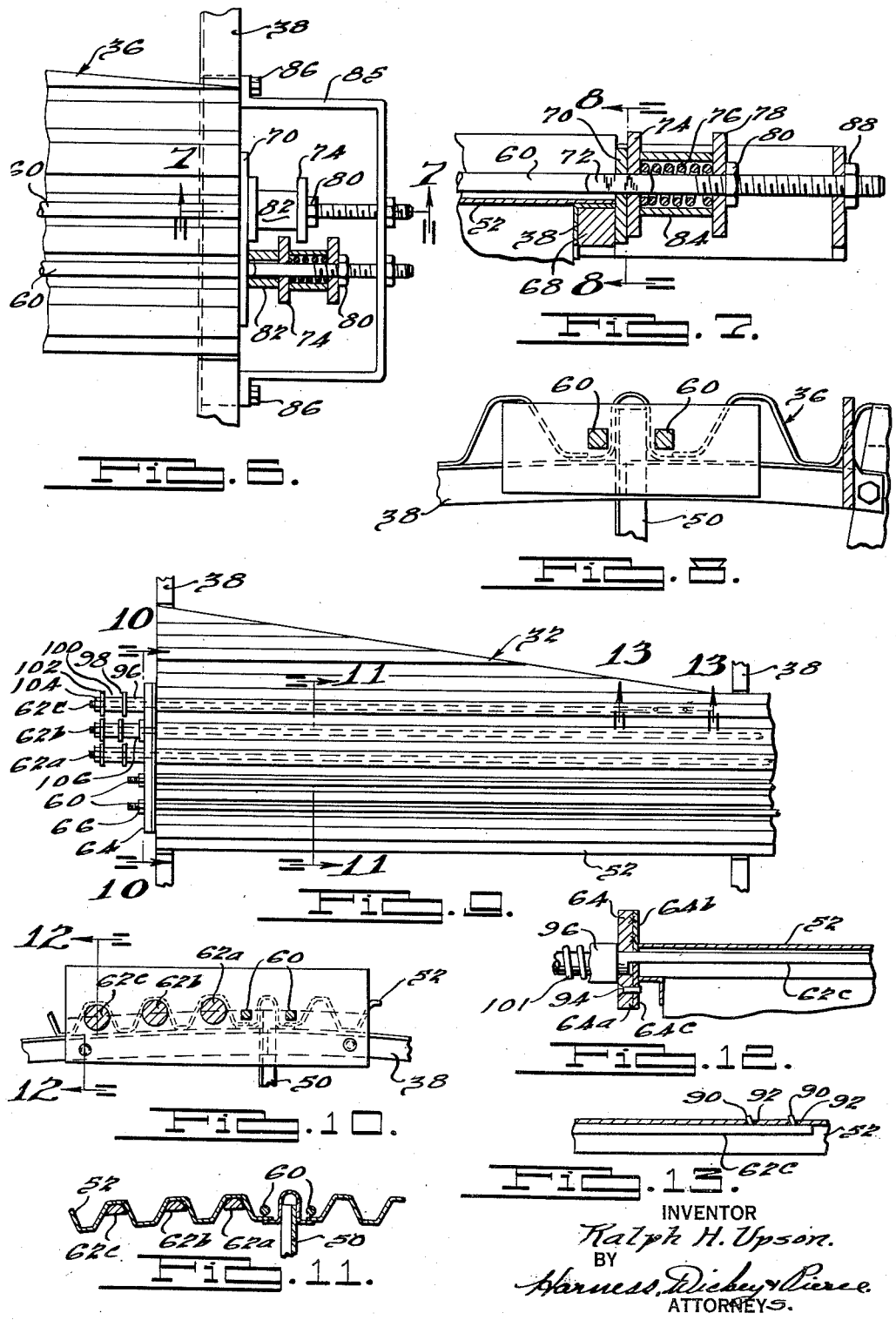

Patented Dec. 5, 1944

2,364,494

UNITED STATES PATENT OFFICE 2,364,494

METHOD OF APPLYING COVERING TO AIRPLANE WING FRAMES

Ralph H. Upson, Ann Arbor, Mich., assignor, by mesne assignments, to Consolidated Vultee Aircraft Corporation, a corporation of Delaware Application June 5, 1941, Serial No. 396,659

7 Claims. (Cl. 29—84)

This invention relates to airplanes and particularly to a method and apparatus for use in connection with the application of a covering to the frames of airfoil surfaces such as wings, flaps, ailerons, tail surfaces or the like, the principal object being the provision of improved method and apparatus by the use of which the covering in one or both surfaces of a wing or the like may be placed under tension.

Objects of the invention include a method of applying a metallic covering to the framework of an airplane wing or the like including the steps of compressing the frame over its length by the application of longitudinally extending forces in the surface to be covered and while such surface is being covered; the provision of a method of covering airplane wing frames and the like including the step of bending the frame over its length to increase the concavity of said surface during the application of the covering thereto, by the application of forces to the frame confined substantially entirely within the frame; the method of straining an airplane wing frame or the like for the purpose of facilitating the application of a covering thereto including the steps of temporarily providing tension elements extending parallel to the surface of the frame to be covered whereby to place that portion of the frame to be covered under a compressive stress during the application of a covering thereto; and the provision of a method of straining an airplane wing frame or the like for the purpose of applying a skin or covering thereto in such a manner that the frame may be readily handled and transported while in strained condition.

Other objects of the invention include the provision of means for straining framework for an airplane wing or the like during the application of a covering thereto comprising rods, temporarily located in closely adjacent relationship with respect to the plane of the surface to be covered and extending longitudinally thereof, together with means cooperating with the frame for placing the rods under sufficient tension to effect the desired straining of the frame; the provision of apparatus as above described including rods of varying lengths; the provision of apparatus as above described including means for definitely determining the tension exerted by the rods; and the provision of apparatus as above described so constructed and arranged to cooperate with the frame as to enable its ready removal upon completion of the wing covering operation.

The above being among the objects of the present invention the same consists in certain novel steps of operation, features of construction and combination of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a fragmentary plan view of an airplane;

Fig. 2 is an enlarged front elevational view of the righthand wing of the airplane shown in Fig. 1;

Fig. 3 is an enlarged plan view of the framework for the rigid portion of the wing shown in Fig. 2 and illustrating the various tension rods provided in accordance with the present invention in position therein for the purpose of temporarily bending the wing frame over its length;

Fig. 4 is a front elevational view of the frame shown in Fig. 3 and showing it in bent condition;

Fig. 5 is an enlarged transverse sectional view taken on the line 5—5 of Fig. 3 illustrating the cross-sectional configuration of the spar of the wing;

Fig. 6 is an enlarged, partially broken, partially sectioned fragmentary plan view of that portion of the frame illustrated within the dotted circle 6 of Fig. 3 to better illustrate the manner in which the tension rods cooperate with the outer end of the spar;

Fig. 7 is an enlarged fragmentary, vertical sectional view taken on the line 7—7 of Fig. 6;

Fig. 8 is a vertical sectional view taken transversely of the construction shown in Fig. 7 as on the line 8—8 thereof;

Fig. 9 is an enlarged, fragmentary plan view of the inner end of the wing spar shown in Fig. 3, as approximately contained within the circle 9 of Fig. 3, to better illustrate the manner in which the inner ends of the tension rods cooperate with the inner end of the wing spars;

Fig. 10 is an enlarged vertical sectional view taken on the line 10—10 of Fig. 9;

Fig. 11 is an enlarged fragmentary transverse sectional view taken on the line 11—11 of Fig. 9;

Fig. 12 is a fragmentary, vertical sectional view taken on the line 12—12 of Fig. 10; and, Fig. 13 is an enlarged fragmentary vertical sectional view taken on the line 13—13 of Fig. 9.

It is generally understood that it is desirable that particularly the upper surface of an airplane wing or other airfoil surface be as smooth as possible. In modern airplanes employing thin sheet metal as a skin or covering for the wings and other surfaces the method employed in applying the thin sheet metal covering or skin to the wing frame, whether it be by riveting or welding, invariably results in producing waves, ripples or other unevenness in the surface of the wing or other airfoil. Such unevenness may be greatly reduced if not entirely eliminated if the frame is compressed over its length in a direction tending to reduce the dimensions of that surface of the frame which is to receive the covering desired to be under a tension and applying such covering while the frame is in such compressed condition. In such case upon relieving the forces causing such compression after the skin or covering has been applied, the return of the wing frame toward its normal condition will place such covering under a tension. Such tension effectively balances the equivalent slack which would otherwise be introduced in the skin by compression in the corresponding frame elements due to the flight loads.

The broad principle of compressing a frame by bending it and applying a skin covering thereto while in bent condition to place the skin or covering under a tension longitudinally of the wing when the bending forces are relieved is disclosed in the application for Letters Patent of the United States of Frank M. Smith for improvements in Method of applying covering to airplane wing frames, filed May 26, 1941, and serially numbered 395,190, which application is owned by the assignee of the present application. The present invention is an improvement over that disclosed in the application above identified in that in accordance with the practices of the present invention the wing may be stressed, without necessarily bending it, in such a manner that the wing frame may be handled and transported while in stressed condition, thus facilitating the application of the skin or covering thereto, as well as other operations thereon during the manufacture of the wing.

Briefly stated, in accordance with the practices of the present invention tension rods are applied to the wing frame substantially in that surface thereof which it is desired to compress and are so constructed and arranged as to apply a compressive force to the members of the wing frame in such surface extending in the direction in which such compression is desired, such compressive force in such members resulting in creating the desired compression of the wing frame. The thin metal skin or covering is then applied to and secured to at least such compressed surface of the wing frame after which the tension rods are removed, thereby relieving the compressive forces on the wing frame and allowing the wing to return toward its normal condition, thus putting the skin or covering under tension. It will, of course, be appreciated that a wing frame may be thus compressed and the skin or covering applied to only that surface thereof compressed by the force of the tension rods whereupon the tension rods may be removed and applied to the opposite surface of the wing frame to cause it to be compressed in turn, the remaining skin or covering applied to such opposite surface, and then the rods removed. Alternatively, such rods may be simultaneously tensioned in both surfaces, causing a compression of both surfaces, under which conditions the covering may be applied simultaneously or otherwise to both surfaces before the tension on the rods is relieved. Both top and bottom coverings of the wing may thus be placed under tension. Inasmuch as it is the top surface of the wing that is generally more subject to compression in flight, and also more adversely affected by the resulting unevenness, in many cases it will be sufficient if the upper surface only of the wing frame is compressed and the skin or covering applied to both surfaces while it is so compressed, the release of the compressive forces resulting in placing the covering for the upper surface only of the wing frame under tension spanwise of the wing.

When such tension rods are applied to both the upper and lower surfaces of a wing frame it will, of course, be appreciated that the frame may be compressed in the direction of the length of such rods without causing any appreciable bending of the frame in a direction perpendicular to the surface of the frame. Where the tension rods are placed in one surface only of the frame and particularly where they are positioned spanwise of such frame, then it will be appreciated that the act of compressing one surface only will tend to bend the ends perpendicular outwardly with respect to such surface and in relation to the central portion thereof. At the present time this appears to be the preferred method of carrying out the invention although it will be understood that the invention is not limited thereto.

It is also possible to place the tension rods in either or both of the upper and lower surfaces of the wing frame and disposed at angles to each other so as to obtain a compression of the frame both spanwise of the wing and at right angles thereto. This will usually not be necessary in order to obtain tension in the covering in all directions due to Poisson's effect and, consequently, in the preferred method of carrying out the present invention the tension rods are extended spanwise of the wing only and are placed in one surface of the wing frame only under which conditions they cause a bending of the frame as previously described, and it is this arrangement that is illustrated in the accompanying drawings as a matter of illustration.

It will, of course, be understood that the wing frame may be initially straight or curved either in an upwardly or downwardly direction. As a matter of illustration and simplicity in description the wing frame shown in the drawings is assumed to be initially straight in spanwise direction so that when the tension rods are placed in the upper surface thereof they effect an upward bending of the ends of the frame relative to the middle, thus causing a concavity of the upper surface of the frame. Where the frame is initially curved in a spanwise direction then the tension rods may either increase or decrease such curvature depending upon which surface they are located in. In order to facilitate description in the following specification and claims, where it is specified that the covering is applied to that surface rendered concave by the tension rods it will be understood that the language has particular reference to the action occurring in an initially straight frame and is intended to equally relate to a construction in which the curvature of an initially convex surface is reduced in convexity by the application of the tension rods, or the curvature of an initially concave surface is increased by the application of the tension rods.

Referring now to the accompanying drawings, in Fig. 1 is illustrated more or less diagrammatically an airplane including a fuselage 20 having wings indicated generally at 22 and tail surfaces indicated generally at 24 supported from the wings 22 through booms 26. The wings 22 have the usual flaps 28 and ailerons 30 mounted along the trailing edges thereof in a conventional manner. Although the present invention may be practiced in connection with the frame for the rigid portion of the wing 22, the frames for the flaps 28 and for the ailerons 30 for the various tail surfaces, and the fuselage, the description of the present invention will be restricted to the rigid portion of the wing structure itself, as once the practices of the present invention in connection with the wing is described its application to other airfoil surfaces will be apparent to those skilled in the art.

The wing which is shown in front elevational view in Fig. 2 includes a framework which is illustrated in Figs. 3 and 4, and while in the practices of the present invention the particular details of construction of the wing frame to be covered is more or less unimportant, the invention is particularly adaptable to a wing frame having one or more spars provided with flanges formed to provide corrugations extending longitudinally thereof, and the application of the present invention to a wing frame having such spars constitutes a more limited phase of the present invention. The particular wing frame illustrated in Figs. 3 and 4 includes a single main spar indicated generally at 36, a plurality of full ribs 38 extending transversely with respect to the length of the wing and arranged in spaced relation to each other over the length of the wing and suitably secured to the spar 36. The rear ends of the various ribs 38 are connected together by a trailing edge member 40 and the leading ends thereof are connected together by a member 42. A plurality of short ribs 44 are interposed between the leading edge member 42 and the spar 36 in spaced relation to each other longitudinally of the wing and in spaced relation to the full ribs 38 as indicated.

The particular spar construction shown constitutes the subject-matter of an application for Letters Patent of the United States for Improvements in spar structure for airplane wings filed by Frank M. Smith on May 9, 1941, and serially numbered 392,679, and owned by the assignee of the present invention. As best brought out in Figs. 3 and 5 the spar 36 includes a web 50 and upper and lower flanges 52. The flanges 52 are corrugated with the corrugations extending lengthwise thereof and the web 50 is also corrugated with the corrugations thereof extending vertically. The upper and lower marginal edges of the web 50 are received within an inwardly directed corrugation of the upper and lower flange respectively, and fixed therein.

As previously stated, in accordance with the present invention the wing frame shown in Figs. 3 and 4 is temporarily bent over its length and maintained in such bent condition during the application of at least the upper covering therefor. In such case the frame is, of course, bent in a direction to concave the upper surface of the wing in edge elevation as indicated in Fig. 4. In other words the tip of the wing frame is raised with respect to its normal free position by bending forces applied to the frame. In accordance with the practices of the present invention these bending forces are exerted by the application of compressive stresses applied directly to the longitudinally extending members in the upper surface of the wing frame. In the particular construction of wing frame shown the only longitudinally extending members in such surface are in effect the upper flanges 52 of the spar 36. The upper surfaces of the trailing edge member 40 and leading edge member 42 may also be considered as being in the upper surface of the wing frame but inasmuch as they are substantially on the neutral axis of the frame they may be disregarded.

In accordance with the present invention the direct application of compressive stress to the upper flange of the spar 36 is accomplished by the use of tension rods extending longitudinally of such flange and arranged in closely adjacent relationship to the plane thereof. Where the flange is of longitudinally corrugated construction as in the case of the flanges 52, then in accordance with a further phase of the present invention such tension rods may be located within the corrugations thereof and, as will be appreciated, in such event such tension rods in such case are actually in the plane of the flange.

In the particular construction shown there are two tension rods 60 which extend the full length of the spar 36 and there are three tension rods 62a, b and c which extend for a portion of the length of the spar only.

As best brought out in Figs. 8, 10 and 11 the tension rods 60 are on the upper side of the upper flange 52 and in the two upwardly facing corrugations on either side of the web 50. The inner ends of the rods 60, as best brought out in Fig. 9, pass through a plate member 64 which abuts against the inner or root end of the upper flange 52 of the spar 36 and are anchored against inward axial movement with respect thereto by means of nuts 66 threaded thereon and abutting such plate member. The plate member 64 will be described in further detail later in connection with the description of the short tension rods 62.

As best brought out in Figs. 6, 7 and 8, at the tip end of the spar 36 a spacer block 68 is fitted into the angular sectioned reinforcing member 38 underlying the upper flange 52 of the spar 36 at that point and into contact with both flanges thereof, and is of such a size that its outer face is flush with the outer end of the upper spar flange 52. A plate member 70 overlies the end surface of the upper flange 52 of the spar 36 and not only bears against the same but also the face of the block 68. This plate member 70 is provided with square openings for the passage of the rod 60 and, as best illustrated in Figs. 7 and 8, the rods 60 at the point where they pass through the member 70 are squared as indicated at 72 in Fig. 7 so as to lock them against turning. Outwardly of the plate member each rod 60 receives a washer 74 thereon followed by a coil spring 76, then by a second washer 78 and then by a nut 80 threaded thereon. In order to avoid interference between the various washers on the rods 60, a spacer 82 is preferably positioned on one of the rods 60 between its corresponding washer 74 and the plate member 70 as indicated in Fig. 6.

With the construction thus far described it will be appreciated that upon drawing down the nuts 80 the springs 76 are compressed and the force required to compress the springs 76 exert a tension in the rods 60 and such tension being directed longitudinally of the upper flange 52 of the spar 36 it places such upper flanges of the spar under compression which tends to bow the spar and the framework in the manner illustrated in Fig. 4. It is, of course, desirable, in order to obtain uniformity in production, that the amount of tension applied to the rods 60, as well as any other tension rods employed for the same purpose, should be predetermined and uniform. The springs 70 in such case are preferably closely calibrated and are surrounded by a hollow cylindrical spacer 84 of such length that when the nuts 80 are drawn up until the washer 78 just contacts the spacers 84 the desired amount of tension will have been applied to the rod 60. Care, of course, must be taken that once the washers 78 contact their spacers 84 no further tightening of the nuts 80 will occur as in such case the tension would build up at a far greater rate than could possibly occur by acting through the springs 76. As a further precaution and as an aid against possible stripping of the threads of the nuts 80 while a wing is being worked upon, a bracket 85 is arranged with its outturned ends secured to the spacer block 58 by means of nuts 86 and extends in outwardly spaced relation with respect to the nuts 80. The bracket 85 is provided with openings for projection of the rods 60 therethrough and outwardly of the bracket the rods are provided with nuts 88 to supplement the holding power of the nuts 80.

As indicated best in Fig. 3 the rods 62a, b and c are of different lengths with the longest one 62a thereof extending approximately two-thirds of the length of the frame. These rods are employed only at the inner end of the spar where it is of greatest strength and which, therefore, requires a greater amount of tension to be applied to the upper flange thereof than in the outer portion of the spar in order to result in the desired bending. As best brought out in Figs. 10 and 11 the rods 62a, b and c are located in successive downwardly opening corrugations of the upper flange 52 of the spar rearwardly of the web 50. The rods 62 are of approximately half round section but of substantially greater diameter than the rods 60 and are arranged with their rounded sides in the bottom of the corresponding corrugations. Their inner ends, as best illustrated in Fig. 13, are fixed against movement with respect to the upper flange 52 of the spar 36 by means of a plurality of pins 90 fixed centrally of the rounded surface thereof adjacent the inner end thereof and which pins project through openings 92 provided therefor in the bottom wall of the corresponding corrugation of the upper flange 52. As illustrated in Fig. 13 the pins 90 are preferably inclined in the direction of the pull on the rods so that such pull will tend to wedge the corresponding ends of the rods upwardly against the bottom wall of the corresponding corrugation.

Referring now to Figs. 10 and 12 it will be noted that the outer ends of the rods 62 are full round in section. As will be noted from an inspection of Fig. 12 the plate member 64 is made up of one portion 64a of relatively thick section and two thinner rear portions 64b and 64c, respectively. The rear portions 64b and 64c are of equal thickness and interfit with one another along a line including the axes of the rods 62. The portion 64b is fixed to the plate member 64a as by welding or the like while the portion 64c is removable therefrom. This portion 64c is located on the portion 64a by means of pins 94 secured to the portion 64a and removably received in suitable openings in the portion 64c. The portion 64a is provided with cylindrical openings therethrough for reception of the full round end portions of the various rods 62, and the plate portion 64b is provided with a half round notch in the edge thereof matching the portion 64c and in alignment with each of the openings in the portion 64a. The plate member 64c, however, has no notch therein corresponding to the openings in the plate member portion 64a and, consequently, its upper edge bears against the flat surface of the various rods 62c and thereby prevents rotational movement of the various rods 62c while they are being tightened or otherwise.

The outer cylindrical end portions of the various rods 62c are threaded and, as best illustrated in Fig. 9, outwardly of the plate members 64 each receives a spacing collar 96, a washer 98, a limit sleeve or spacer 100 followed by a washer 102 in turn followed by a nut 104, these elements corresponding to the elements 82, 74, 84, 78 and 80 of the construction illustrated in Fig. 7. The limit sleeves 100 are in surrounding relationship with respect to a coil spring 101 surrounding each rod 62 and corresponding with the spring 76 described in connection with Fig. 7, as indicated in Fig. 12. In the construction illustrated in Fig. 9 in order to space the various washers 102 to prevent interference with one another, a washer 106 is placed under the sleeve 96 for the rod 62b in order to effect such result. It will, of course, be appreciated that the means just described being substantially identical to the corresponding parts described in connection with Fig. 7, the operation and function of these parts are substantially the same as those described in connection with Fig. 7. In other words, the rods 62 and their various associated parts having been assembled in the manner illustrated in Fig. 9, the nuts 104 are drawn up on the threaded ends of the various rods 62a, b and c until the corresponding washers 102 thereof have compressed the springs 101 and brought the washers 102 substantially into contact therewith, this acting to place the various rods 62 under the desired predetermined degree of tension. It is, of course, understood that the force exerted by the rods 60 and 62 while sufficient to effect the desired amount of bending of the frame, is not sufficient to stress any of the frame elements beyond their elastic limit. The amount of force applied should, of course, be sufficient to insure that the tension in the upper covering will still be present, although obviously less than under static conditions, when the wing is subjected to loads ordinarily expected to be met with in normal service.

It will be appreciated that upon all of the rods 60 and 62 being drawn up and placed under tension in the manner described, such tension acting in the plane of the upper flange 52 of the spar 36 will bend the frame into the form illustrated in Fig. 4 with an upwardly directed concavity and to the extent desired during the application of the skin or covering to at least the upper surface thereof. It might be noted that in cases where the amount of bend imparted to the wing frame is such that the rods 60 in exerting their force on the frame and naturally tending to assume a chord-like relation with respect to the curve of the upper surface of the wing frame project above the outer surface of the spar flange, they may be temporarily clamped or otherwise held down in their respective corrugations ahead of the covering as it is being applied and the covering, after application, will hold the rods downwardly in the corrugations thereboIw.

The wing frame thus being bent as above illustrated and as shown in Fig. 4, the wing covering is then applied to at least that surface which is on the concave side of the curvature resulting from the bending operation. This covering is applied in sheets or strips and in the broader aspects of the invention, such sheets or strips may be applied with their lengths extending either spanwise or crosswise of the frame as in either case the covering will be placed under tension when the frame is allowed to return towards its normal position. However, as a matter of illustration in the drawings and as shown in Figs. 1 and 2, the covering is applied in sheets or strips 110 of a width corresponding to the spacings of the ribs 38, or they may be slightly wider than such spacings so that the adjacent edges of adjacent sheets may overlap each other on the line of such ribs. Obviously the sheets may be secured to the ribs by riveting, or by welding where the character of the material from which the sheets are formed is adapted to spot welding or the like. In applying the covering sheets 110 it will be ordinarily preferable to place them under a tension transversely of the length of the wing where possible and ordinarily this can be done without too great difficulty particularly in view of the fact that the forward and rearward edges of such sheets will be free to receive clamping devices or the like to apply a tension thereto during the greater portion of the operation of applying the sheet to the wing frame.

It will be appreciated that in applying the sheets 110 to the wing frame, the sheets being initially flat and formed from thin sheet metal and being curved transversely of the length of the wing, they will tend to be disposed with lines thereof extending longitudinally of the wings straight and in a chord-like relation between adjacent ribs with respect to the curvature of the wing frame between such ribs. The sheets are, of course, preferably first applied at one end, preferably the tip, and successively applied between adjacent ribs 38 towards the opposite end. After all of such sheets have been applied as above described, the nuts 56 on the inner ends of the rods 60 may be removed and the rods 60 and the various parts surrounding the same at the outer end thereof simply withdrawn lengthwise out of the frame. The nuts 104 on the various rods 62 may also be removed, the various washers 98, 102 and 106 together with the spacers 96, limit sleeves 100 and springs 101 may be removed, the plate portion 64c removed and then the various rods 62 moved inwardly until the pins 90 become disengaged from their corresponding openings 92 upon which the various rods 60 may be pulled endwise out of the wing frame. When the nuts 66 and 104 are loosened on their corresponding rods 60 and 62 the compressive stress applied thereby to the upper flange of the spar 36 will, of course, be relieved and the wing frame will tend to resume its normally straight position. In returning to its normally straight position the wing frame will, of course, cause the spacing between the various ribs 38 longitudinally of the wing and at the upper surface thereof to be increased, this effect serving to place the various sheets 110 on the upper surface of the wing under a tension longitudinally of the wing as will be readily appreciated, and also place them under a tension transversely thereto because of Poisson's effect, and this tension acting on the thin metal covering 110 will tend to stretch it and smooth out any ripples or unevenness that might otherwise be present therein.

Where it is not desired or not considered necessary to put the skin or covering on the bottom surface of the wing under tension, then, of course, the covering therefor may be applied at the same time that the covering for the upper surface is applied to the wing frame, or at some later time. Where, as previously described, the compression of the frame results in bending of the same as in the case illustrated and it is also desired to place the covering for the lower surface of the wing under tension, then after the upper surface is covered as above described the rods 60 and 62 may be applied to or in association with the lower flange of the spar thereby to cause the wing frame to be bent in a direction opposite to that in which it was first bent, the covering applied to the lower surface, the rods removed and the covering for the lower surface of the wing frame thus also placed under tension. It will, of course, be appreciated that whether it is a wing frame or some other frame that is to be covered the general method herein outlined may be employed for compressing the frame therefor while the covering is applied thereto and in such case the same result may be obtained regardless of the particular framework to be covered, or the direction in which tension is desired.

Having thus described my invention what I claim by Letters Patent is:

1. In the application of a thin metal skin to the frame of an airplane wing or the like having a longitudinally extending spar provided with a flange lying approximately in one surface thereof and provided with corrugations extending longitudinally thereof, the steps of applying tension rods to said flange within corrugations thereof, anchoring opposite ends of said rods with respect to said flange, setting up a sufficient tension in said rods to effect an upward bending of said flange and frame with respect to the central portion thereof, applying said thin metal skin to said surface of said frame and fixing said skin thereto, and then removing said rods.

2. In the application of a skin or covering to a framework, the steps of applying a force longitudinally of the frame elements on one side of the neutral axis thereof and substantially only in the plane of the face of said side, tending to draw one end of said framework toward the other end thereof, without restricting the expansion or contraction of the elements of said framework on the opposite side of said neutral axis, whereby to cause said framework to be bent over the length thereof, applying to the surface of said framework on that side of said neutral axis first mentioned while said framework is so bent a thin sheet covering and fixing it to said framework, and then relieving said force.

3. In the application of a skin or covering to the framework for an airplane wing, the steps of applying a force substantially solely in the upper surface of said wing frame tending to contract the spanwise elements of said frame in said surface without simultaneously restricting expansive and contractive movements of spanwise extending elements in the lower surface of said frame, applying a thin sheet metal covering to said upper surface and securing it thereto while under the influence of said force, and then relieving said force.

4. In the application of a skin or covering to an airplane wing frame having spanwise extending elements extending substantially to the exterior surface thereof, the steps of applying to said spanwise elements substantially in the upper surface only of said frame a compressive force varying in intensity over the length of said frame, without restricting expansive and contractive movements of the spanwise extending elements of said frame lying substantially in the lower surface thereof, said forces being of sufficient intensity to cause said frame to be bent over its length, applying a thin sheet metal covering to said upper surface of said wing while in said bent condition and rigidly fixing it thereto, and thereafter relieving said compressive forces.

5. In the application of a sheet or skin to an airplane framework, the steps of applying a force lying substantially only in the upper surface of said framework tending to draw the tip and the root ends of said framework toward one another, applying an additional force substantially only in said upper surface of said framework tending to draw the root end of said framework toward a point materially spaced from the tip end thereof, said forces being sufficiently great to cause said framework to be longitudinally bent, applying said covering to said upper surface of said framework and fixing it thereto while in said bent condition, and then relieving said forces.

6. In the application of a sheet or skin to an airplane framework, the steps of applying a force lying substantially only in the upper surface of said framework tending to draw the tip and the root ends of said framework toward one another, applying an additional force substantially only in said upper surface of said framework tending to draw the root end of said framework toward a point materially spaced from the tip end thereof, applying a still further force substantially only in said upper surface of said framework tending to draw the root end of said framework toward an additional point in said surface lying between said root end of said framework and the last-mentioned point, said forces being sufficiently great to cause said framework to be longitudinally bent, applying said covering to said upper surface of said framework and fixing it thereto while in said bent condition, and then relieving said forces.

7. In the application of a skin or covering to a framework, the steps of applying a force longitudinally of the frame elements on one side of the neutral axis thereof and substantially only in the plane of the face of said side, tending to draw one end of said framework toward the other end thereof, without restricting the expansion or contraction of the elements of said framework on the opposite side of said neutral axis, whereby to cause said framework to be bent over the length thereof, applying to the surface of said framework on that side of said neutral axis first-mentioned while said framework is so bent a thin sheet covering, tensioning said covering in a direction transverse to the length of said framework and then fixing said covering to said framework, and then relieving said force.

RALPH H. UPSON.